(12) United States Patent
Goodson et al.

(10) Patent No.: US 9,189,551 B2
(45) Date of Patent: Nov. 17, 2015

(54) METHOD AND APPARATUS FOR CATEGORY BASED NAVIGATION

(75) Inventors: Scott Paul Goodson, La Honda, CA (US); Sourav Chatterji, Fremont, CA (US); Jeremy Ryan Schiff, Portola Valley, CA (US); Corey Layne Reese, Portola Valley, CA (US); Paul Kenneth Twohey, Palo Alto, CA (US)

(73) Assignee: OPENTABLE. INC., San Francisco, CA (US)

( * ) Notice: Subject to any disclaimer, the term of this patent is extended or adjusted under 35 U.S.C. 154(b) by 455 days.

(21) Appl. No.: 13/553,646

(22) Filed: Jul. 19, 2012

(65) Prior Publication Data

US 2013/0024456 A1 Jan. 24, 2013

Related U.S. Application Data

(60) Provisional application No. 61/509,995, filed on Jul. 20, 2011, provisional application No. 61/509,999, filed on Jul. 20, 2011, provisional application No. 61/510,003, filed on Jul. 20, 2011, provisional application No. 61/510,004, filed on Jul. 20, 2011.

(51) Int. Cl.
*G06F 7/00* (2006.01)
*G06F 17/30* (2006.01)

(52) U.S. Cl.
CPC .... *G06F 17/30864* (2013.01); *G06F 17/30634* (2013.01); *G06F 17/30657* (2013.01); *G06F 17/30699* (2013.01); *G06F 17/30705* (2013.01)

(58) Field of Classification Search
None
See application file for complete search history.

(56) References Cited

U.S. PATENT DOCUMENTS

| | | | |
|---|---|---|---|
| 6,370,513 B1 * | 4/2002 | Kolawa et al. | 705/7.33 |
| 7,653,761 B2 | 1/2010 | Juster et al. | |
| 7,818,394 B1 | 10/2010 | Lawler et al. | |
| 7,966,305 B2 | 6/2011 | Olsen | |
| 8,095,432 B1 | 1/2012 | Berman et al. | |
| 8,145,619 B2 * | 3/2012 | Bowden et al. | 707/710 |
| 8,347,211 B1 | 1/2013 | Rogers et al. | |
| 8,359,285 B1 | 1/2013 | Dicker et al. | |
| 8,719,198 B2 | 5/2014 | Zheng et al. | |

(Continued)

OTHER PUBLICATIONS

International Search Report and Written Opinion of the International Searching Authority, Issued in PCT/US12/47473 on Oct. 10, 2012, 17 pages.

(Continued)

*Primary Examiner* — Loan T Nguyen
(74) *Attorney, Agent, or Firm* — Hickman Palermo Becker Bingham LLP; Daniel E. Miller (57) ABSTRACT

Embodiments of the invention relate to a category based navigation system obtaining user data related to a plurality of users relevant to the primary user. The method further comprises obtaining entity data associated with an entity in a plurality of entities. The category based navigation system then determines one or more entities relevant to the primary user, and determines an initial order of relevance of a set of relevant entities. The method further comprises categorizing and displaying the set of relevant entities with an initial categorization on a user device to the primary user. The category based navigation system may then obtain, via the user device, user feedback, adjust the initial categorization and initial order of relevance based on the user feedback; and display the adjusted categorization and adjusted order of relevance of the set of relevant entities to the primary user on the user device.

30 Claims, 4 Drawing Sheets

(56) References Cited

U.S. PATENT DOCUMENTS

| | | | |
|---|---|---|---|
| 2006/0200435 | A1 | 9/2006 | Finn et al. |
| 2007/0050192 | A1 | 3/2007 | Gutta et al. |
| 2007/0112761 | A1 | 5/2007 | Xu et al. |
| 2007/0118498 | A1 | 5/2007 | Song et al. |
| 2007/0239702 | A1 | 10/2007 | Vassilvitskii et al. |
| 2007/0282621 | A1 | 12/2007 | Altman et al. |
| 2008/0104059 | A1 | 5/2008 | Segel |
| 2008/0214162 | A1 | 9/2008 | Ramer et al. |
| 2008/0215565 | A1 | 9/2008 | Sun et al. |
| 2008/0244429 | A1 | 10/2008 | Stading |
| 2009/0024605 | A1 | 1/2009 | Yang |
| 2009/0076928 | A1 | 3/2009 | Hjertonsson et al. |
| 2009/0177644 | A1 | 7/2009 | Martinez et al. |
| 2009/0204600 | A1 | 8/2009 | Kalik et al. |
| 2009/0222304 | A1 | 9/2009 | Higgins et al. |
| 2009/0234664 | A1* | 9/2009 | Schaffnit et al. .............. 705/1 |
| 2009/0234878 | A1 | 9/2009 | Herz et al. |
| 2010/0023508 | A1 | 1/2010 | Zeng et al. |
| 2010/0076968 | A1* | 3/2010 | Boyns et al. .............. 707/732 |
| 2010/0211558 | A1 | 8/2010 | Bonbeau et al. |
| 2010/0250336 | A1 | 9/2010 | Selinger et al. |
| 2010/0306229 | A1 | 12/2010 | Timm et al. |
| 2011/0125759 | A1* | 5/2011 | Querel et al. .............. 707/748 |
| 2011/0145066 | A1 | 6/2011 | Law et al. |
| 2011/0225291 | A1 | 9/2011 | Dobroth et al. |
| 2011/0231383 | A1* | 9/2011 | Smyth et al. .............. 707/707 |
| 2012/0209839 | A1* | 8/2012 | Andrews et al. .............. 707/728 |
| 2012/0295640 | A1* | 11/2012 | Mei et al. .............. 455/456.3 |
| 2014/0258270 | A1 | 9/2014 | Reese et al. |
| 2014/0289228 | A1* | 9/2014 | Mei et al. .............. 707/722 |

OTHER PUBLICATIONS

International Search Report and Written Opinion of the International Searching Authority, Issued in PCT/US12/47476 on Oct. 1, 2012, 11 pages.
International Search Report and Written Opinion of the International Searching Authority, Issued in PCT/US12/47475 on Sep. 27, 2012, 24 pages.
International Search Report and Written Opinion of the International Searching Authority, Issued in PCT/US12/47478 on Oct. 12, 2012, 17 pages.
International Searching Authority, "Search Report" in application No. PCT/US12/47478, dated Oct. 12, 2012, 19 pages.
International Searching Authority, "Search Report" in application No. PCT/US12/47476, dated Oct. 1, 2012, 11 pages.
International Searching Authority, "Search Report" in application No. PCT/US12/47475, dated Sep. 17, 2012, 24 pages.
International Searching Authority, "Search Reoprt" in application No. PCT/US12/47473, dated Oct. 10, 2012, 17 pages.
U.S. Appl. No. 13/553,599, filed Jul. 19, 2012, Office Action, Oct. 16, 2013.
U.S. Appl. No. 13/274,235, filed Oct. 14, 2011, Office Action, Aug. 26, 2014.
U.S. Appl. No. 13/553,599, filed Jul. 19, 2012, Office Action, Oct. 2, 2014.
U.S. Appl. No. 13/274,226, filed Oct. 14, 2011, Office Action, Jul. 29, 2014.
U.S. Appl. No. 13/553,599, filed Jul. 19, 2012, Final Office Action, Jun. 5, 2014.
U.S. Appl. No. 13/553,684, filed Jul. 19, 2012, Office Action, Jul. 17, 2014.
U.S. Appl. No. 13/274,235, filed Oct. 14, 2011, Final Office Action, Jan. 28, 2014.
European Patent Office, "Search Report" in application No. 12815280.8-1952, dated Jan. 5, 2015, 8 pages.
Claims in European Application No. 12815280.8-1952, dated Jan. 2015, 4 pages.
Blount, S., "Talking Yellow Pages, Buyers in 20 Cities Now Let Their Fingers Do the Talking Through Automated Telephone Advertising Message Systems", vol. 10, No. 10, dated Oct. 1, 1987, 1 page.
U.S. Appl. No. 13/553,703, filed Jul. 19, 2012, Office Action, Dec. 31, 2014.
U.S. Appl. No. 13/553,684, filed Jul. 19, 2012, Notice of Allowance, Feb. 5, 2015.
U.S. Appl. No. 13/274,226, filed Oct. 14, 2011, Interview Summary, Dec. 16, 2014.
European Patent Office "Search Report" in application No. 12815207.1-1952, dated Mar. 20, 2015, 13 pages.
European Claims in application No. 12815207.1-1952, dated Mar. 2015, 3 pages.
U.S. Appl. No. 13/274,235, filed Oct. 14, 2011, Final Office Action Feb. 23, 2015.
U.S. Appl. No. 13/274,226, filed Oct. 14, 2011, Final Office Action Feb. 24, 2015.
Claims in Australian Application No. 2012283930, dated May 2015, 5 pages.
Claims in Australian Application No. 2012283928, dated May 2015, 9 pages.
Australian Patent Office, "Patent Examination Report No. 1" in application No. 2012283930, dated May 5, 2015, 3 pages.
Australian Patent Office, "Patent Examination Report No. 1" in application No. 2012283928, dated May 12, 2015, 3 pages.
U.S. Appl. No. 13/553,703, filed Jul. 19, 2012, Notice of Allowance.
Claims in Canadian Application No. 2,842,255, dated Jul. 2015, 5 pages.
Claims in Australian application No. 2012283929, dated Jun. 2015, 8 pages.
Canadian Intellectual Property Office, "Examier Report" in application No. 2,842,255, dated Jul. 2, 2015, 5 pages.
Canadian Intellectual Property Office, "Exam Report" in application No. 2,842,215, dated Jul. 8, 2015, 3 pages.
Canadian Claims in application No. 2,842,215, dated Jul. 2015, 8 pages.
Australian Patent Office, "Patent Examination Report No. 1" in application No. 2012283929, dated Jun. 11, 2015, 3 pages.

* cited by examiner

METHOD AND APPARATUS FOR CATEGORY BASED NAVIGATION

CROSS-REFERENCES TO RELATED APPLICATIONS

This application claims priority from U.S. Provisional Patent Application No. 61/509,995 filed Jul. 20, 2011, entitled "Method and Apparatus for Category Based Navigation".

The present disclosure may be related to the following commonly assigned U.S. Provisional Patent Applications: U.S. Provisional Patent Application No. 61/509,999 filed Jul. 20, 2011 entitled "Method and Apparatus for Explaining Recommendations", U.S. Provisional Patent Application No. 61/510,003 filed Jul. 20, 2011 entitled "Method and Apparatus for Allowing Users to Augment Searches", and U.S. Provisional Patent Application No. 61/510,004 filed Jul. 20, 2011 entitled "Method and Apparatus for Quickly Evaluating Entities".

The respective disclosures of these applications/patents are incorporated herein by reference, as if set forth in full in this document, for all purposes.

FIELD OF THE INVENTION

The present invention relates to data navigation systems in general and in particular to a category-based navigation system that provides category-based navigation for users, via user devices, in order to search for relevant data and/or recommendations.

BACKGROUND OF THE INVENTION

The Internet has become a useful source of information relating to goods and services, but because so many users and companies are connected to the Internet and providing information of their own, it is difficult to find relevant information among all available information. One area of information is in recommendations. As individuals and groups are now able to connect to the Internet and retrieve information from websites and via apps, and do so perhaps while in transit towards a geographic area of interest, they come to expect the ability to find information about goods and services being offered.

One source of information is in the form of websites hosted by or for providers. As used herein, "website" refers to a collection of one or more web pages displayable by a browser or other web client, the one or more web pages being hosted on a web server (i.e., a computer coupled to the Internet, or other network over which communication occurs) that responds to requests for pages hosted thereon. An example might be a restaurant that generates information about its hours, pictures of its dining room, contact information, history, menus and other offerings, then puts that information into a suitable form (such as HTML pages, dynamically generated pages, etc.), stores those pages in electronic storage accessible by the web server (hosted by the restaurant or perhaps a company that specializes in web presence that provides such services to the restaurant), and then serves those pages as client devices request pages. The information might also be presented in another form, such as data supplied to an app on the client device rather than a generic browser on the client device.

However, while the restaurant gets the information to interested users, it is still limited to information sourced by that restaurant. A number of websites have been set up to collect information from other customers of a vendor of goods or services and provide reviews and comments and other details to other customers or potential customers. For example, there might be a website that focuses on hotels, another on restaurants, and another on home repair, or a general one. However, these websites might just have too much information to be useful to a user searching for relevant recommendations.

Additionally, with the increase of users participating in social media websites, users are also interested in getting information about their friends, and the opinions of their friends. For example, a user may find out that a number of their friends on a social media website highly recommend a restaurant, which may be more persuasive to that user than the recommendations of strangers or high rankings on general rating websites. Thus, social media websites that provide information to a user regarding the user's friends may also be another source that the user refers to in gathering information and searching for relevant recommendations. However, social media websites allow users to provide a wide variety of information that may or may not be related to what a user is searching for (e.g., status updates unrelated to a vendor of goods or services), and it is also difficult to cross-reference the recommendations of friends through social media websites with general websites providing reviews, or websites for particular businesses, in a user's search for relevant recommendations.

Thus, there is a massive amount of data to be processed in order for a user to search for relevant data and find what the user has sought out to seek. Realistically, a user cannot sort through all the information collected through various sources, so a more efficient means of processing the data is needed, such as a data navigation system.

An improved recommendations system is desirable.

BRIEF SUMMARY OF THE INVENTION

Embodiments of the invention relate to improved navigation methods and systems. Existing methods for providing data navigation to a target user may not provide options to the target user to modify the navigation based on customized attributes, such as categories. Thus, if the target user is unable to navigate through a massive amount of data to find what is needed, it is difficult for the target user to feed back to a navigation system how the target user would like to navigate through the data to more efficiently find what the target user is looking for, or how the target user would like the data to be organized (i.e., categorized). Therefore embodiments of the invention provide methods and systems in which a target user can more efficiently navigate through data, such as entity evaluations or personalized recommendations.

Thus, providing category based navigation to the target user is advantageous and allows users to modify and organize data such that navigation through the data is executed in the most optimal and efficient manner for the target user. Additionally, data navigation systems, and other systems in use of such data navigation systems (e.g., entity search systems, personalized recommendation systems, entity navigation systems, etc.) are improved in this manner by becoming more intelligent about providing search results to its users that may be navigated based on categories.

Embodiments of the invention relate to a computer-implemented method comprising a category based navigation system obtaining, at a server computer operated by the category based navigation system, user data related to a plurality of users relevant to the primary user. Then, the category based navigation system stores the user data, wherein the user data associated with the plurality of users is stored in a user database. The method further comprises obtaining entity data from a plurality of data sources, wherein the entity data is associated with an entity in a plurality of entities. The entity may provide goods or services to the target user. The category based navigation system then stores the entity data, determines one or more entities relevant to the primary user based on the entity data and user data, and determines an initial order of relevance of a set of relevant entities. The method further comprises categorizing the set of relevant entities with an initial categorization and displaying, on a user device, the initial categorization and initial order of relevance of the set of relevant entities to the primary user. The category based navigation system may then obtain, via the user device, user feedback related to the initial categorization and initial order of relevance of the set of relevant entities, adjust the initial categorization and initial order of relevance based on the user feedback; and display the adjusted categorization and adjusted order of relevance of the set of relevant entities to the primary user, wherein the primary user provide a response to entities in the set of relevant entities via the user device.

In another embodiment, the method further comprises obtaining, at the server computer, location data from an external data source in a plurality of data sources associated with the target user, wherein the location data is associated with an entity in a plurality of entities. The location data, associated with the plurality of entities, may be stored at the server computer in the entity database. The method may further include updating the entity database with the location data for a corresponding entity in the entity database; and adjusting the initial categorization and initial order of relevance based on the location data in the updated entity database.

In another embodiment, the method may include obtaining, at the server computer, personal data from the plurality of data sources, wherein the personal data is associated with the primary user in the plurality of users. The personal data may be stored at the server computer, wherein personal data associated with the plurality of users is stored in the user database. The category based navigation system may then merge the personal data from the plurality of data sources, map the personal data from the plurality of data sources to the primary user, and updated the user database with the personal data and user data associated with the primary user. The method may further comprise determining whether an entity is associated with the personal data from the primary user, determining whether the entity associated with the personal data corresponds with an entity associated with location data in the entity database, and mapping the entity associated with the personal data from the primary user to the corresponding entity associated with the location data. Then, the category based navigation system may determine inferred location data based on the mapping, update the entity database to include the inferred location data associated with the corresponding entity; and adjust the initial categorization and initial order of relevance based on the personal data in the updated user database and the updated entity database.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

An improved navigation system is described herein. In order to provide a context for describing embodiments of the present invention, embodiments of the invention will be described herein with reference to a user device receiving personalized recommendations which the user may navigate through. Those skilled in the art will recognize, however, that the present invention is not limited to such embodiments.

It should be understood that, given the complexity of the operations performed, the invention is implemented using computing elements and may also include communication elements that convey data between disparate locations.

System Overview

Figure 1:
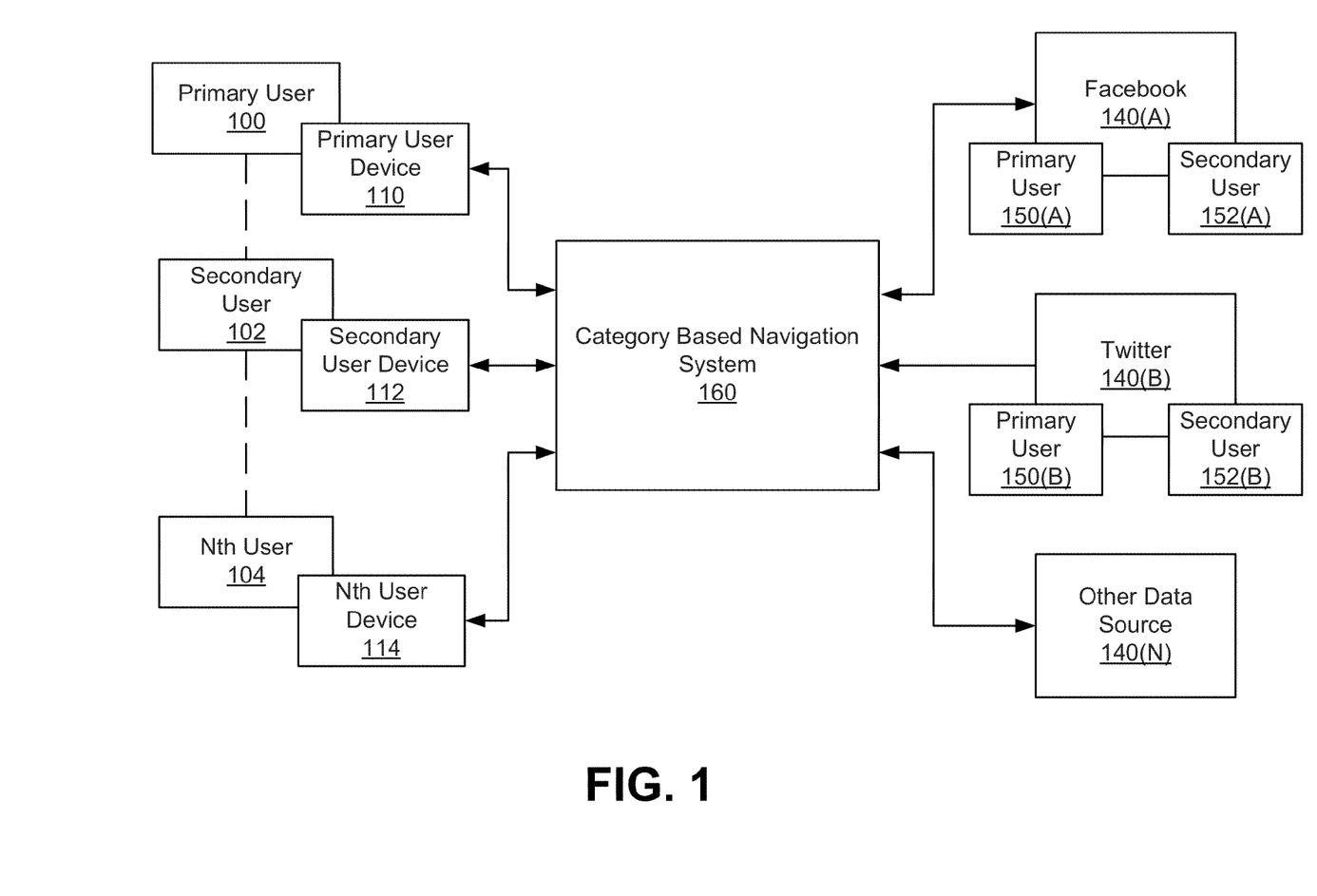
FIG. 1 is a block diagram of a navigation system according to aspects of the present invention.
Figure 2:
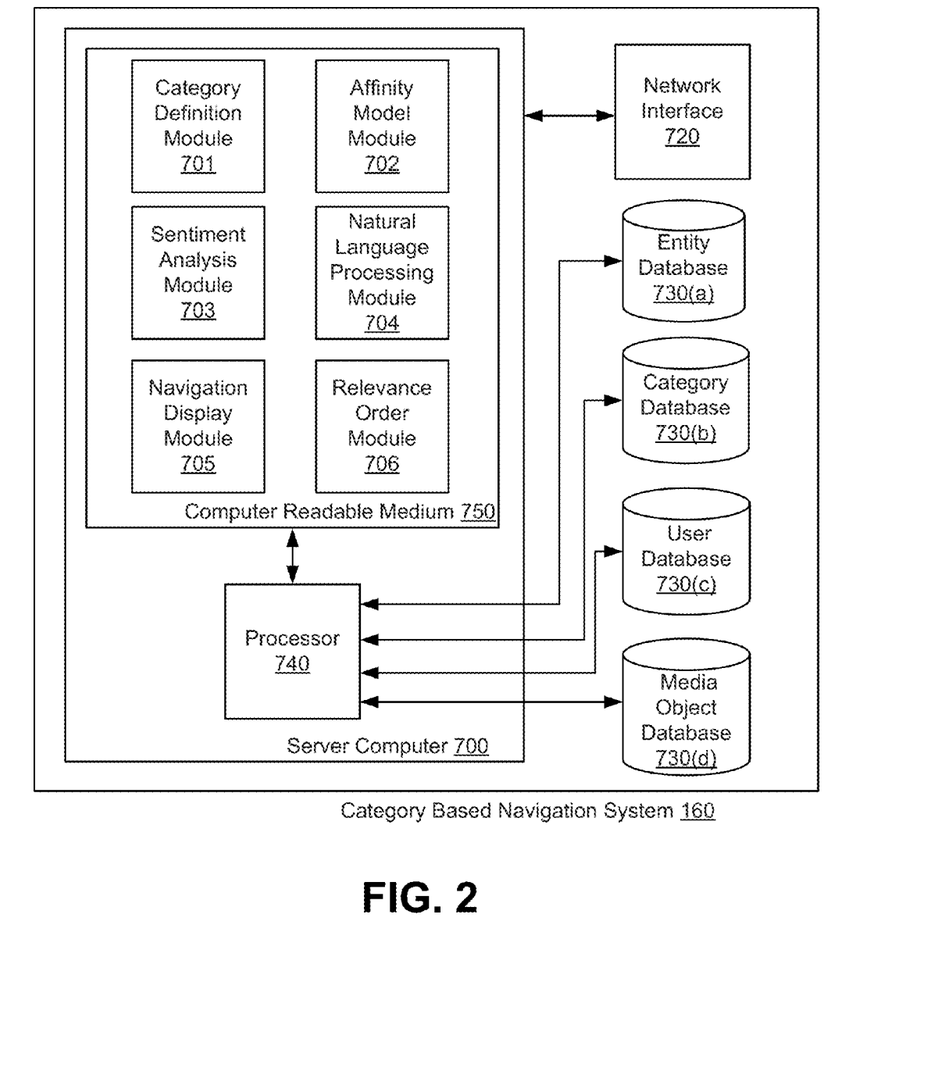
FIG. 2 is a block diagram of a modularized navigation system according to aspects of the present invention.

In FIG. 1, an exemplary personalized navigation system according to an embodiment of the invention is shown. The personalized navigation system 160 may be coupled to a plurality of users, such as a primary user 100, secondary user 102, or any number of users 104. There may be relationships between specific users, for example, the primary user 100 and secondary user 102 may be friends, family members, or co-workers. The plurality of users may be coupled to the personalized recommendations system 160 through associated user devices 110, 112, and 114. User devices may include mobile phones (e.g., a Blackberry™ phone, an iPhone™ device, an Android™ device), tablets (e.g., an iPad™ tablet), or other electronic devices. Although in some embodiments the personalized navigation system is coupled to a personalized recommendation system, the invention is not limited to cases where a personalized recommendation system is involved.

The personalized navigation system 160 may obtain inputs from any number of users 100, 102, and 104, registered with the personalized recommendations system 160. The users 100, 102, and 104 may be interconnected and have relationships with one another. The inputs may be transmitted through the user devices 110, 112, 114 via an application. The user devices 110, 112, 114 may be connected to the personalized navigation system 160 through the internet, a wireless network, a telecommunications network, or any suitable communications network. For example, the primary user 100 may use the primary user device 110 to download and install an application issued by the personalized navigation system 160. Through the application, the primary user 100 may edit personal ratings for entities, such as venues and restaurants, and other personal preferences, such as cuisine, type of food, price range, location, distance from current location, etc. The primary user 100 may also provide feedback items or data through the application to respond to recommendations, to add or remove entities, and/or rate an experience at an entity. In other embodiments of the invention, entities may include merchants and service providers. In other embodiments, there may be multiple simultaneous users who are interacting with the navigation system through a common interface or separate interfaces, simultaneously or not.

Additional inputs to the personalized navigation system 160 may come from external data sources, for example, a social network computer system such as the Facebook™ computer system 140(A), a public messaging system such as the Twitter™ messaging system 140(B), and/or any number of other data sources 140(N) via the user accounts 150(A), 150(B), 152(A), 152(B) with the data sources and/or user devices 110, 112. The external data sources may also provide raw location data of the users, for example, through a "check-in" through system 140(A), system 140(B), or other social networking provider system capable of providing raw location data. The other data sources 140(N) may themselves have associated user accounts, which may map directly or indirectly to user accounts of other systems.

Data about users and their attributes, and relationships between users, between users and entities, and between users and other things that are not entities in the navigation system may be stored in a variety of ways. Affinity graphs are one data structure that some embodiments use to manage this information. The personalized navigation system or provider may use affinity graphs as models of the affinity between users or entities and users or entities, either in general or with respect to a given attribute or cluster of attributes of the users or entities, as a graph. Affinity graphs may represent relationships between users and entities, users and other users, or entities and other entities, and may be used to determine recommendations. Attributes provide additional information about a node in the graph. For example, an attribute may be the zoom level of a camcorder type or the primary cuisine type of a restaurant. Entities may be represented by nodes, with individual users being one type of entity. Edges represent relationships between nodes. Directional edges can model unidirectional relationships, such as if person A follows person B on Twitter. A symmetric relationship, like friends on Facebook, may be represented as two directional edges, or a unidirectional edge.

These relationships may be about different associations other than social affiliations, such as an expertise graph where an edge from user A to user B indicates that user A believes user B to be an expert. There may also be weights on these edges, which for example, might represent the confidence in another user's expertise, or represent how familiar two users are with each other. Affinity graph nodes may be further augmented with additional information such as short form textual messages, pictures, check-ins, other explicit or implicit annotations that are used to denote a user has visited or prefers a location, or other explicitly tagged content. The affinity graph may be constructed by users choosing to link themselves to other nodes, or by aggregation and analysis methods which infer the links and weights.

In some embodiments, such inputs may be used as evaluation data by a personalized recommendations system to generate and provide recommendations and/or recommendation explanations to users. The navigation system may be operated by the personalized recommendations systems, or they may be operating separately or in conjunction with one another. Exemplary evaluation data used by the personalized recommendations system may include ratings on a discrete star scale for the quality of a restaurant for a restaurant discovery website/product or answers to personality questions for a match making website/service. Evaluation data may be associated with one entity or a set of entities. For example, a user may rate Jane's Sushi 90/100 and may rate sushi restaurants in general 82/100.

What entities may be involved in the system depend on the embodiment may be anything that can be represented or referred to in a computer system. In some embodiments, entities are providers of goods and services, such as restaurants or nightclubs. In other embodiments, entities are particular goods or services or events, such as a particular dish at a restaurant or a one-time or repeating event such as a concert. In others entities are documents or sections of documents, such as text pages or musical compositions, to be presented to a user. In other embodiments, an entity may be a relationship or potential relationship between two people. For example, a dating recommendation system may recommend in favor of or against a potential relationship between one user and another, or may allow searches for potential relationships meeting some criteria. In another example, entities may be individuals.

Using affinity graphs, evaluation data, entity data, and/or other algorithms and data, the personalized recommendations system may generate recommendations along a single or multiple dimensions, and/or over a discrete or continuous domain. Recommendations may be numerical, textual, pictorial, auditory, or tactile in fashion. Recommendations may be include any of these characteristics, either alone or in combination. For example, a user may rate a restaurant on a scale of 1, 2, 3, 4, or 5 stars, with 1 star being the lowest rating, and 5 stars being the highest rating. In another realization, a user may instead rate a restaurant on a 1-5 star scale for taste rating, 1-4 "$" scale for price rating, and add an optional one word description. Another example of a recommendation (e.g., evaluation) involves having a team of doctors choosing a picture that best represents the mood of a clinical patient. Other examples may include recording a five second video to make a review or recommendation, an audio summary of a protest or event, or in a mobile application, dragging pictorial representations of entities into rating categories. In another example, a recommendation may be inferred from aspects of a user's behavior such as whether the user looks in one direction or another, or whether the user walks or turns in one way or another.

Example recommendations may be, but are not limited to being, textual (e.g., a short 20 word comment), continuous (e.g., a ratings slider), discrete as in star ratings, pictorial (e.g., a representative picture, drawing, or photograph which most closely resembles the entity), auditory (e.g., a volume measurement or review), gestural (e.g., a swipe up or down), visual (e.g., an interpretive dance for the entity), or some combination thereof. Recommendations may involve adding edges or weights, either individually or some combination to one or more affinity graphs.

Some recommendations may not be intuitive to the primary user viewing the recommendation. Thus, the navigation system according to embodiments of the invention, may provide efficient searching and sorting of all the aggregated data and recommendations for the primary user, such that the most relevant data and recommendations can be brought to the primary user's attention.

Enabling Category Based Navigation

In various embodiments, our system uses a catalogue of categories, stored in a category database, which may be explicit or generated from a catalogue of entities each of which may belong to one or more categories. The catalogue of entities may be stored in an entity database. Each entity may belong to multiple categories and entities may themselves be categories. For example, the catalogue may contain restaurants along with the types of cuisines they serve, with one primary cuisine per restaurant and an ordered list of secondary cuisines. An example of multistage categories is the taxonomy of animal life starting with kingdoms, and extending all the way to individual species. Categories need not belong to a single hierarchy; they can be partially overlapping and the structure can be as rich as a (hyper) graph. An example would be research projects which may have multiple funding agencies, where the funding agency would be the category being navigated.

The catalogue may be local to the device displaying results or reside remotely on other machine(s) which provide an interface to the catalogue. The user database and entity database could be NoSQL databases, an SQL database, another information retrieval system such as a computer filesystem, or an in-memory data store. In other embodiments, the system could have a temporary piece of data obtained from a third-party on demand, such that data does not need to be statically or locally stored. A database could consist of multiple storage facilities, such as a cache backed by a database or a normalized authoritative database and denormalized in-memory stores.

Figure 4:
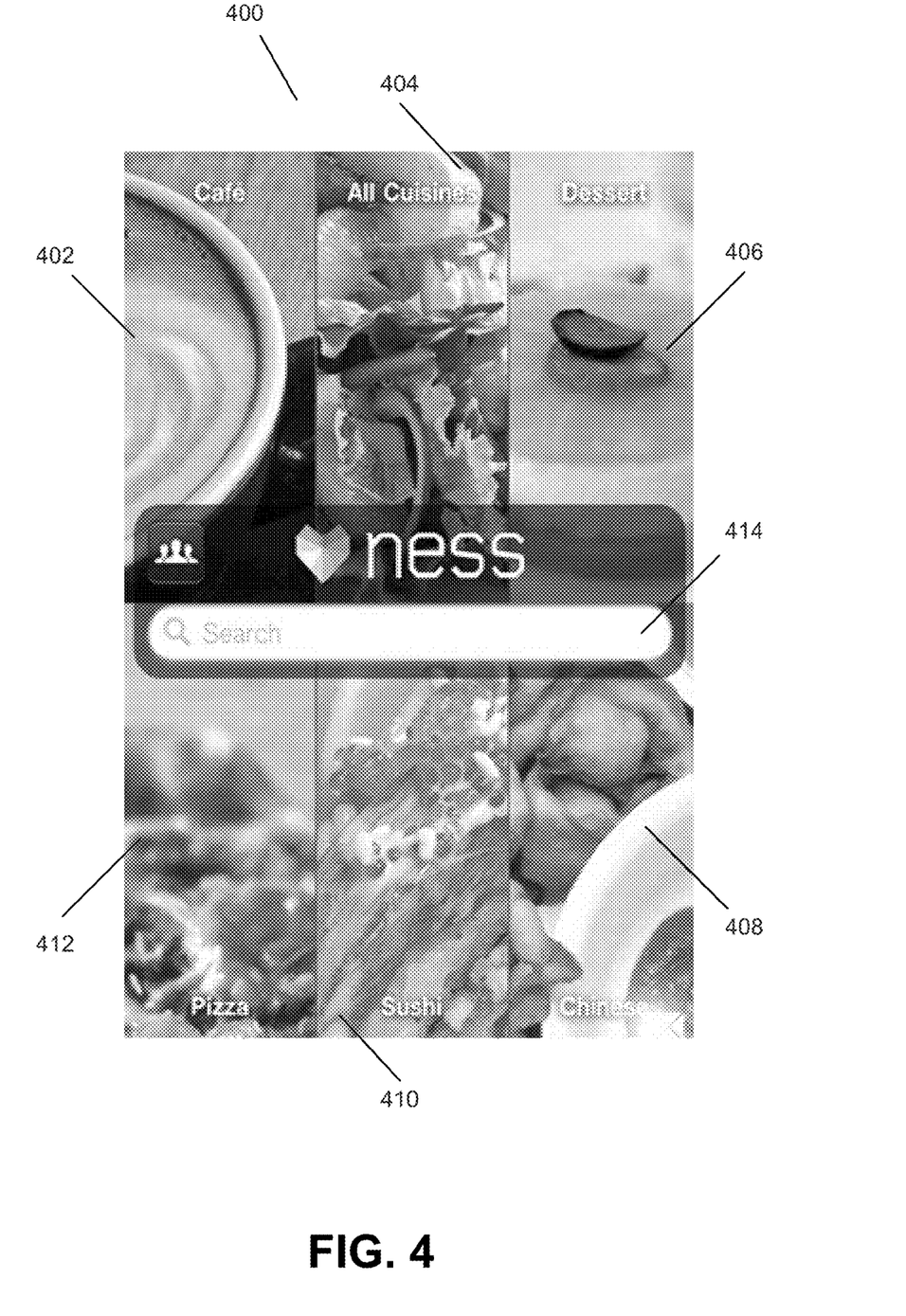
FIG. 4 illustrates an exemplary user display according to an embodiment of the invention.

When the user is navigating the categories in our system they are presented with a subset (which may be the entire set) of the available categories, formatted to fit the available display area. FIG. 1 provides one example interface for movie categories as a list. The interface may have multiple navigation modalities for the categories present simultaneously. For example, FIG. 4 shows a textual and pictorial representation of restaurant categories which also provides an input area 414 where a user can type a category. The category or categories shown by a navigation modality may or may not be shown by other navigation modalities. Additional examples of navigation modalities include carrousels, a stream of data, an audible list as synthesized by a computer or read by a human, photographic album displays, iconographic or pictographic album displays, voice recognition based input, a system for recognizing sign language as performed into a video camera or three dimensional sensing device, shaking or otherwise engaging an accelerometer and or gyroscope to physically manipulate a device, touch based gestures, three dimensionally sensed gestures individually or in some combination, using haptic technology to send information back to a user, using a heads-up display to send information to a user, and using gaze information (that is, where the user is looking or has looked).

The category based navigation system according to embodiments of the invention has a variety of options for the initial ordering of categories presented to the user including a manually curated category ordering, orderings computed based on the context of the user and their navigation optionally including their previous navigation history, and popularity. Popularity may be computed in a more user-specific way, rather than doing a single popularity computation for each user. It could be computed using a variety of metrics incorporating different spatial, temporal, social, demographic, and user interaction based signals either alone or in combination. Examples include counting "the number of check-ins to places with a given cuisine," counting "the number of check-ins on Tuesdays between 3 pm and 4 pm to a place with a given cuisine," counting "the number of times a cuisine was queried using a search or discovery service," counting "the number of times a dish that is part of a cuisine was queried for on weekends using a search or discovery service," and "the relative popularity of female users who explicitly state they like one cuisine (sushi) over another (Italian) on an online service with profiles." Examples of services that provide check-in data include those provided by Gowalla, Facebook, etc. Examples of services that provide space for stating preferences, providing comments, etc. might include blogging services, such as those provided to users of Wordpress software or services.

Examples of initial contextual information may include the time the user is navigating the categories, demographic information about the user, the location the user is querying from as determined by a GPS or other location sensing method, explicit input from the user's affinity graph, and implicit input from the user's affinity graph, individually or in combination.

As used herein, an affinity model is a model of the affinity between individuals in general or with respect to a given attribute or cluster of attributes as a graph. Attributes provide additional information about a category. In this graph, entities are nodes, with users being one type of entity. Edges represent relationships between nodes. Directional edges can model unidirectional relationships, such as if person A follows person B on Twitter. We can represent a symmetric relationship like friends have on Facebook, as two, directional edges, or a unidirectional edge. These relationships may be about different associations than social affiliations, such as an expertise graph where an edge from person A to person B means that person A believes person B may be an expert. There may also be weights on these edges, which for example, might represent the confidence in someone's expertise, or how friendly two people are. Affinity graph nodes may be augmented with additional information such as short form textual messages, pictures, check-ins or other explicit or implicit annotations used to denote a user has visited or prefers a location, and explicitly tagged content. The affinity graph may be constructed by users choosing to link themselves to other nodes or by aggregation and analysis methods which infer the links and weights.

Thus an affinity graph acts as a model of the affinity between users or entities and users or entities, either in general or with respect to a given attribute or cluster of attributes of the users or entities, as a graph. Affinity graphs may represent relationships between users and entities, users and other users, or entities and other entities, and may be used to determine recommendations. Attributes provide additional information about a node in the graph. For example, an attribute may be the zoom level of a camcorder type or the primary cuisine type of a restaurant. Entities may be represented by nodes, with individual users being one type of entity. Edges represent relationships between nodes. Directional edges can model unidirectional relationships, such as if person A follows person B on Twitter. A symmetric relationship, like friends on Facebook, may be represented as two directional edges, or a unidirectional edge.

Explicit input from a primary user's affinity graph may include actions taken by the users at the primary user's neighboring nodes. For example, a poll asking a primary user's followers (e.g., relevant users) which categories the primary user would most prefer. Then, the top categories chosen by each neighbor for him or herself may be aggregated on the top, and that aggregate may be used for the primary user's category ordering. Neighboring nodes are nodes that are neighboring in the affinity graph. For instance, where edges in the graph indicate following relationships, follower/followees will be neighboring nodes. Affinity graphs could be augmented in various ways, such as through additional data or inferred data, therefore in some cases, neighboring nodes may indicate the most relevant users, users the target user communicates with, who the target user is most similar to, etc. In this specific example, neighboring nodes would be friends or followers, or at least people the target user knows or interacts with.

Implicit input from a primary user's affinity graph may include analysis of textual messages linked directly or indirectly to a primary user node. The category based navigation system according to embodiments of the invention may use natural language processing (NLP), and optionally sentiment analysis, on user generated messages, such as those on Facebook, and Twitter, to understand the content of messages. First, name-entity recognition may be performed to understand the mapping between a message, for instance a short-form message on Facebook (e.g., status update or post), and the entity in our system, such as a location, an event, or a cuisine type which the message is about. The category based navigation system may then optionally perform sentiment analysis on the messages to understand whether an experience at a given entity was a positive or negative experience, and to what degree. The sentiment analysis may go further to understand why the users had a good time, for example, at a restaurant, if the users enjoyed the food, ambiance, service, etc. The mapping recognized by NLP and sentiment analysis may serve in weighting the category ordering for navigation, either alone or in combination with other inputs. Implicit input from data sources such as the affinity graph can likewise be used to infer the categories entities should be placed in themselves. For instance, one might use tags or keywords associated with the entities to construct categories, or might infer latent categories through a topic model.

Implicit input may also be in the form of explicitly denoting that a primary user may have frequented a location and using that to infer the user's preference for the location, either alone or relative to other locations. One example is using check-ins on a service like FourSquare to infer that since a user checked into 50 different sushi restaurants and never an Italian restaurant, that they have a preference for sushi over Italian. Another example is using the time of check-ins to infer that a user prefers to frequent day spas in the morning and not the afternoon. These features do not have to be restricted to user-only or category-only. For example, when adjusting a group of user's statistics, the category based navigation system may cluster the users' category orderings based on the demographic information of the users, and the number of check-ins in a specific category, rather than just the categories themselves.

Implicit input can also take the form of counting or statistically analyzing augmented attributes of the affinity graph. For example, counting that existing Miami, Fla. users in aggregate prefer deep tissue massage over Thai style massage could indicate that new users from Miami Fla. may have deep tissue massages be shown to them at a higher order of relevance than Thai style massages in a massage category ordering. The demographic data can involve one augmented attribute, such as a user's hometown, or a combination of other attributes, such as political affiliation, gender, and age.

User feedback may be either explicit or implicit, and may include data gathered and used by the navigation system without the user's knowledge. In an example, a user may provide explicit feedback instructing the system to hide one category or to rank it low and out of the way, or customizing what categories are used or how they are generated. In another example, the system may automatically rank low categories that are rarely used. Use may be based on tapping on a category to get more information, or may be based on completion of an act such as contacting a person, purchasing something, or getting directions to a location. In another example, the system may use information about where the user gazes to make statistical inferences about what categories are of interest to the user and which ones are not, and to adjust the ordering accordingly. In another example, the system may observe that the user searches in one category before finding an item that is classified in a different category, infer from this that the user expected the item to be in the first category, and adjust or augment the categorization of items accordingly.

Figure 3:
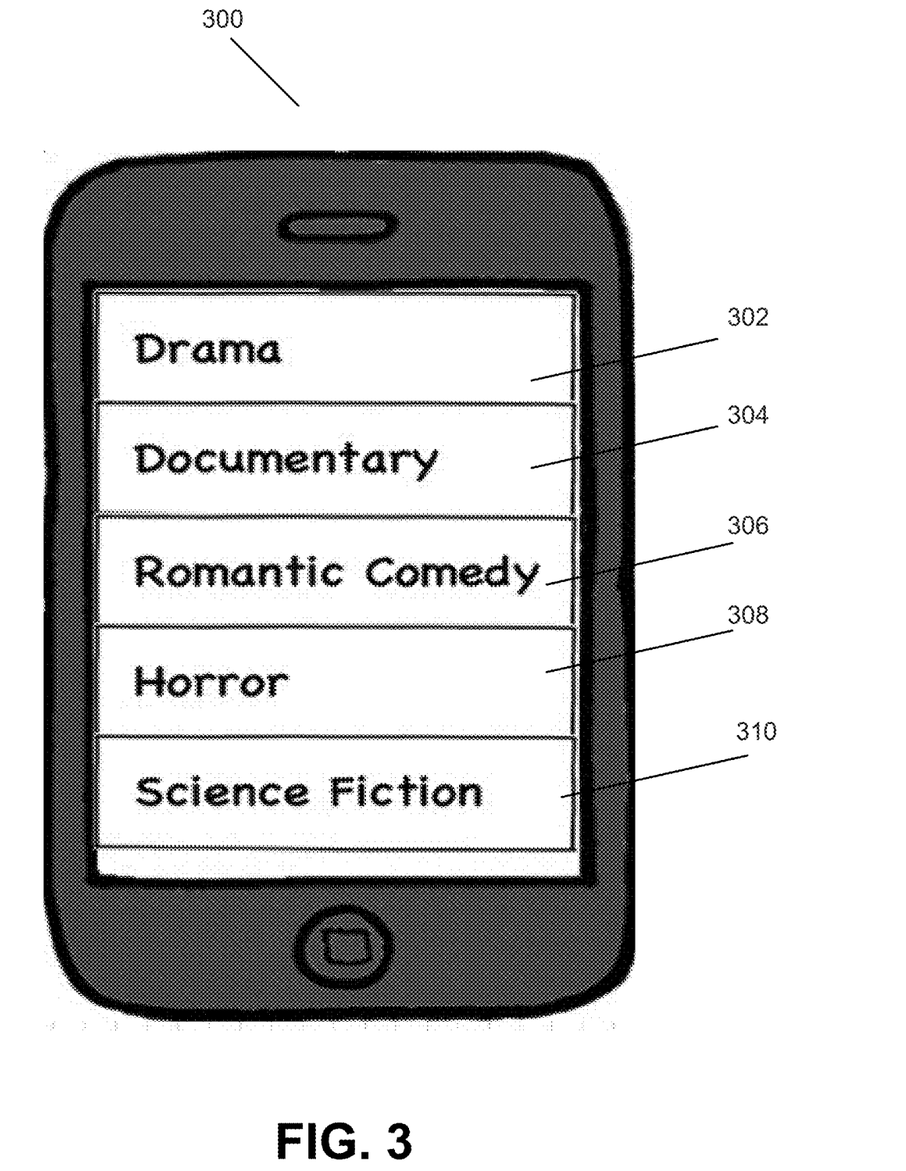
FIG. 3 illustrates an exemplary user display according to an embodiment of the invention.

FIG. 3 shows a block diagram of an exemplary modular category based navigation system 160 according to an embodiment of the invention, where the category based navigation system 160 is configured to provide recommendations of relevant entities organized by category and in an order of relevance. In other embodiments of the invention, an explanations provider may be separate from the recommendations provider, and may be operated by different systems. In the example shown in FIG. 3, the personalized recommendations system 160 operates as the recommendations provider and explanation (i.e., recommendations explanation) provider.

The category based navigation system 160 may comprise a server computer 700, which may be a single computer, a cluster of computers, a server, or a super computer. Processes and methods implemented by or at the server computer could also be implemented by or at a client, in various embodiments. The server computer 700 may comprise a processor 740, and a non-transitory computer readable medium 750, on which code is stored. There may be several databases to store data, for example, an entity database 730(a), a category database 730(b), a user database 730(c), and a media object database 730(d). Stored in the entity database 730(a) may be entity data relating to entities, including entity meta-data (e.g., location, hours of operation, specialty, rating). Entity meta-data may include any sub-category of data related to the entity. The category database 730(b) may store previously determined and selected factors from a plurality of users. The user database 730(c) may store user data obtained from a plurality of users, such as real-time data from social networking sites (e.g., tweets, status updates), and stored data related to a plurality of users, such as user preferences and settings (e.g., gender, dietary restrictions). The real-time data may be explicit or implicit, and may include text, images, video, audio, or other media. The user data may be directly obtained from the user or may be obtained from external data sources, such as a social networking site associated with the user. The category based navigation system 160 may also include a media object database 730(d), storing media objects, such as high resolution photos. The media objects may be associated with entities, recommendations, and/or the target user, and may be used in the display of the entities in their categories and order of relevance.

The code stored on the non-transitory computer readable medium 750 may be in modules, and is executable by the processor 740 to perform functions, which are implemented as processing steps described above by the category based navigation system providing recommendation explanations. The non-transitory computer-readable medium 750 may comprise software modules, such as a category module 701, an affinity model module 702, and a sentiment analysis module 703, a natural language processing (NLP) module 704, a navigation display module 705, and a relevance order module 706. The functions of these modules are described in the process flows described above, and work in conjunction with external data sources (e.g., Facebook, Twitter), and users using user devices running an application (e.g., mobile app).

The category based navigation system 160, to communicate with external data sources, social networking sites, and users, may include a network interface 720. The network interface 720 includes hardware and software that enables the category based navigation system 160 to transmit and receive data over the Internet or any other communications network (e.g., telecommunications network, cable, radio).

User Interfaces and Display on User Devices

FIG. 3 illustrates an exemplary user display 300 that allows category based navigation. There are five categories: Drama 302, Documentary 304, Romantic Comedy 306, Horror 308, and Science Fiction 310. These categories may correlate to genres for movies or books. A user can select any one of these categories by clicking on it with a finger gesture on a touch-screen of the user device 300. For example, selecting "Documentary" 304 may then bring up a list of documentary movies playing in the area close to the location of the user and user device.

As the primary user navigates through categories the category based navigation system may track and monitor his or her usage with various metrics which may be used alone or in combination to alter the category ordering(s) shown to the primary user. The ordering (e.g., order of relevance) may change at any time. For example, the order may change before a primary user chooses a category, immediately after a primary user choses a category, at a fixed time each day, or at an arbitrary point in the future. The change in the order of relevance may or may not happen in synchrony when the primary user is interacting with the application (i.e., app) on his or her user device (e.g., mobile phone, tablet). For example, the order could change when the app is opened for the first time, when the primary user is viewing a part of the app without interacting with the category ordering, or in the background when the primary user is not interacting with the app as well. As another example, the order could change due to the app being used in a different context, such as at lunchtime rather than dinnertime, or due to the app being used from a desktop computer rather than a mobile device.

Adjusting the navigation does not have to work in a binary way between an initialization set and then according to information from the user, such as an explicit response from the user via interacting with the app. The information from the primary user can be incorporated gradually, and affect the order of relevance in more severe ways as more information is learned about the primary user or a group of users preferences. For example, if there are two categories A and B, and the criteria for determining an order of relevance includes a number of times a specific category is selected (e.g., by clicking on the mobile app), both A and B could be pre-seeded with a number of clicks. If A was seeded with 5 clicks and B was seeded with 3 clicks from the initialization, it would require B to be clicked on 3 more times than A for B to gain ordering preference over A (e.g., having B placed at a higher order of relevance to the primary user over A).

Metrics used may also include the time the primary user took to make a choice, the categories visible when the primary user made a choice, the categories the primary user recently viewed before making a choice, the time of day and date the user made the choice, the frequency and distribution with which a user has chosen a category both with respect to their choices and the choices of relevant cohorts of the population including the whole population, or the number of times the and manner in which the user has navigated the category display. Additionally, pictures or other media objects may be displayed along with the category (for example, which picture is displayed along with the sushi category in food navigation environment). Other metrics may include how the user has evaluated entities in a given category, and the location as determined by a GPS or other location sensing mechanism when the user makes a choice.

The category orderings may be altered in different ways for different navigation modalities. FIG. 4 illustrates an exemplary user display 400 enabled to allow category based navigation via a user device. There may be a search field 414 where the user could input desired key terms, locations, entities, preferences, etc. The search field could display a type ahead ordering based an the user's frequency of category selection for the day of the week while the picture and text boxes could be selected based on highest rated categories from the user and their immediately neighboring nodes on an affinity graph. In the user display 400, there are six categories for different types of restaurants that the user may choose from to narrow his or her search, if the user does not enter a key term into the search field 414. The user may select to see a list of cafés by clicking on "Café" 402. For a list of dessert venues, the user may click on "Dessert" 406. If the user wishes to search for pizza, he or she may click on "Pizza" 412. Other categories may include "Sushi" 410, and "Chinese" 408. The categories may be represented by pictures or other media objects to entice the user, and may be based on the user's preference, previous clicking history, or other attributes.

The user may have the option to control the ordering using any number of interaction methodologies. Ordering control can be as simple as moving one category in a list or reordering an explicit list, such as selecting a category by clicking on its corresponding media object and dragging it to its desired order or location on the user display. The user may have the option of clicking a button or buttons to perform any number of editing actions, including, but not limited to: removing a category, moving a category to the front, moving a category to the back, switching a category's position with another selected category, reversing an already existing order, and randomizing the order. These same editing actions may be driven via other input cues. Examples of input cues to activate the editing actions may include finger gestures, shaking a device, a coordinated motion between two devices such as taping them together, blowing on a device, spinning a device, making a distinctive sound, or speaking a voice command. For example, a user may say, "Always show sushi" so that the sushi category 410 is always displayed on top.

The ordering may be controlled using representations which do not show an explicit ordering or the entire ordering. One example is using choice based games, for example, pairing off cuisines and having a user choose which cuisine they prefer to aid a mobile application operated by the system to learn what the target user likes. Other examples include showing the primary user pictures so the user can rate the desirability of each picture. The cuisine types shown in the pictures and their respective ratings may then be used to create an order of relevance. These representations are not limited to input from the primary user themselves, but may also be influenced by another user suggesting an order of relevance for the primary user, or the primary user suggesting an order of relevance to his or her friends. These representations can also be crowd-sourced across multiple users.

The description provides preferred exemplary embodiment(s) only, and is not intended to limit the scope, applicability or configuration of the invention. Rather, the description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Further embodiments may be envisioned to one of ordinary skill in the art after reading this disclosure. In other embodiments, combinations or sub-combinations of the above disclosed invention may be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A computer-implemented method for category based navigation for a primary user, the computer-implemented method comprising:
   determining a set of relevant users, the relevant users being users deemed, by a computer evaluation process, to be relevant to the primary user, wherein the set of relevant users is a subset of data representing a plurality of users;
   obtaining, at a server computer, user data related to the set of relevant users;
   storing the user data at the server computer in a user database, wherein the user data base database includes user data of other users of the plurality of users;
   obtaining entity data from one or more data sources, wherein the entity data is associated with an entity a plurality of entities;
   storing the entity data at the server computer, wherein the entity data associated with the plurality of entities is stored in an entity database;
   determining, at the server computer, a set of relevant entities relevant to the primary user from the plurality of entities based at least in part on the entity data and the user data;
   categorizing the set of relevant entities with an initial categorization based at least in part on the entity data;
   aggregating the user data for the set of relevant entities to create an initial order of relevance for the categories in the initial categorization;
   displaying, on a user device, at least an indication of the initial categorization and the initial order of relevance;
   obtaining, via the user device, user feedback related to the initial categorization and the initial order of relevance;
   adjusting the initial categorization based on the user feedback to form an adjusted categorization and an adjusted order of relevance, wherein the adjusted categorization and the adjusted order of relevance are based on the location data in the entity database;
   displaying the adjusted categorization and the adjusted order of relevance to the primary user; and
   obtaining, from the primary user, a response to the categorization of entities in the set of relevant entities via the user device.

2. The computer-implemented method of claim 1, further comprising:
   obtaining, at the server computer, location data associated with the primary user, wherein the location data is associated with the categorization of the plurality of entities;
   storing the location data at the server computer, wherein the location data is stored in the entity database; and
   adjusting the initial categorization and the initial order of relevance based on the location data in the entity database.

3. The computer-implemented method of claim 2, further comprising:
   obtaining, at the server computer, personal data from a plurality of social networking sites, wherein the personal data is associated with the primary user in the plurality of users;
   storing the personal data at the server computer, wherein personal data associated with the plurality of users is stored in the user database;
   merging, by the server computer, the personal data from the plurality of social networking sites;
   mapping, by the server computer, the personal data from the plurality of social networking sites to the primary user;

updating the user database with the personal data and the user data associated with the primary user;

determining, at the server computer, whether an entity is associated with the personal data from the primary user;

determining, at the server computer, whether the entity associated with the personal data corresponds with an entity associated with the location data in the entity database;

mapping the entry associated with the personal data from the primary user to the corresponding entry associated with the location data;

updating the entry database to include the location data associated with the corresponding entry; and adjusting the initial categorization and initial order of relevance based on the personal data in the updated user database and the updated entry database.

4. The computer-implemented method of claim 1, wherein determining the initial order of relevance or adjusted order of relevance is based on criteria.

5. The computer-implemented method of claim 4, wherein the criteria includes a number of responses initiated by the primary user to a specific category or relevant entity.

6. The computer-implemented method of claim 4, wherein the criteria includes one or more categories or entities that the primary user recently responded to.

7. The computer-implemented method of claim 4, wherein the criteria includes a current location of the primary user.

8. The computer-implemented method of claim 4, wherein the criteria includes a frequency in which the primary user interacts with a relevant entity.

9. The computer-implemented method of claim 1, wherein the initial order of relevance is random.

10. The computer-implemented method of claim 1, wherein a response via the user device includes finger gestures, clicking, shaking the user device, a coordinate motion between two user devices, blowing on the user device, spinning the user device, making a sound, or speaking a voice command.

11. The computer-implemented method of claim 1, wherein the displaying further comprises: determining a set of media objects associated with the set of relevant entities; and displaying the set of media objects with the set of relevant entities.

12. The computer-implemented method of claim 1, further comprising:

merging, by the server computer, the user data from a plurality of data sources; wherein the plurality of data sources include social networking sites;

mapping, by the server computer, the user data from the plurality of data sources to a corresponding entity;

differentiating, by the server computer, the user data from the plurality of data sources associated with each corresponding entity; and determining, at least in part, the set of relevant entities by a computer process to cross-reference the entity data and user data from each data source.

13. The computer-implemented method of claim 1, wherein the user data comprises social networking cues, wherein the method further comprises:

for each social networking cue from the user data, determining, by the server computer, a weight for the social networking cue associated with how friendly the primary user is with the user that made the social networking cue based on the social networking cues and a social network site from where the social networking cue originated; and adjusting the initial categorization and initial order of relevance based on the weight.

14. The computer-implemented method of claim 1, wherein the user data comprises social networking cues, wherein the method further comprises:

for each social networking cue from the user data that includes a short form message, performing name-entity recognition on the social networking cue to determine a mapping between the social networking cue and an entity in the entity database; and determining, by the server computer, to what degree the social networking cue is positive or negative.

15. The computer-implemented method of claim 1, wherein obtaining, via the user device, user feedback related to the initial categorization includes:

obtaining a first response and a second response;

wherein the first response includes a first selection of a first category;

wherein the second response includes a second selection of a second category that is different than the first category, and a third selection of a particular entity that is classified in the second category; and adjusting the initial categorization based on the user feedback to form the adjusted categorization and an adjusted order of relevance includes:

adjusting the particular entity into the first category; and adjusting the initial order of relevance based on the particular entity being in the first category.

16. A server computer comprising a processor and a non-transitory computer-readable medium, the non-transitory computer-readable medium comprising code executable by the processor to implement a method for category based navigation for a primary user, the method comprising:

determining a set of relevant users, the relevant users being users deemed, by a computer evaluation process, to be relevant to the primary user, wherein the set of relevant users is a subset of data representing a plurality of users;

obtaining, at a server computer, user data-related to the set of relevant users;

storing the user data-at the server computer in a user database, wherein the user includes user data of other users of the plurality of users;

obtaining entity data from one or more data sources, wherein the entity data is associated with a plurality of entities;

storing the entity data at the server computer, wherein the entity data associated with the plurality of entities is stored in an entity database;

determining, at the server computer, a set of relevant entities comprising one or more entities relevant to the primary user based at least in part on the entity data and user data;

categorizing the set of relevant entities with an initial categorization based at least in part on the entity data;

aggregating the user data for the set of relevant entities to create an initial order of relevance for the categories in the initial categorization;

communicating to the primary user, on a user device, at least an indication of the initial categorization to the primary user;

obtaining, via the user device, user feedback related to the initial categorization;

adjusting the initial categorization based on the user feedback to form an adjusted categorization and an adjusted order of relevance, wherein the adjusted categorization and the adjusted order of relevance are based on the location data in the entity database;

communicating to the primary user, via the user device, the adjusted categorization and the adjusted order of relevance to the primary user; and obtaining, from the primary user, a response to the categorization of entities in the set of relevant entities via the user device.

17. The server computer of claim 16, the method further comprising:

obtaining, at the server computer, location data associated with the primary user, wherein the location data is associated with the categorization of an entity in a plurality of entities;

storing the location data at the server computer, wherein the location data is stored in the entity database; and adjusting the initial categorization and initial order of relevance based on the location data in the entity database.

18. The server computer of claim 17, the method further comprising:

obtaining, at the server computer, personal data from a plurality of social networking sites, wherein the personal data is associated with the primary user in the plurality of users;

storing the personal data at the server computer, wherein personal data associated with the plurality of users is stored in the user database;

merging, by the server computer, the personal data from the plurality of social networking sites;

mapping, by the server computer, the personal data from the plurality of social networking sites to the primary user;

updating the user database with the personal data and user data associated with the primary user;

determining, at the server computer, whether an entity is associated with the personal data from the primary user;

determining, at the server computer, whether the entity associated with the personal data corresponds with an entity associated with the location data in the entity database;

mapping the entry associated with the personal data to the corresponding entry associated with the location data;

updating the entry database to include the location data associated with the corresponding entry; and adjusting the initial categorization and initial order of relevance based on the personal data in the updated user database and the updated entry database.

19. The server computer of claim 16, wherein determining the initial order of relevance or adjusted order of relevance is based on criteria.

20. The server computer of claim 19, wherein the criteria includes a number of responses initiated by the primary user to a specific category or relevant entity.

21. The server computer of claim 19, wherein the criteria includes one or more categories or entities that the primary user recently responded to.

22. The server computer of claim 19, wherein the criteria includes a current location of the primary user.

23. The server computer of claim 19, wherein the criteria includes a frequency in which the primary user interacts with a relevant entity.

24. The server computer of claim 16, wherein the initial order of relevance is random.

25. The server computer of claim 16, wherein the response via the user device includes finger gestures, clicking, shaking the user device, a coordinate motion between two user devices, blowing on the user device, spinning the user device, making a sound, or speaking a voice command.

26. The server computer of claim 16, wherein the communicating further comprises: determining a set of media objects associated with the set of relevant entities; and displaying the set of media objects with the set of relevant entities.

27. The server computer of claim 16, the method further comprising:

merging, by the server computer, the user data from a plurality of data sources; wherein the plurality of data sources include social networking sites;

mapping, by the server computer, the user data from the plurality of data sources to a corresponding entity;

differentiating, by the server computer, the user data from the plurality of data sources associated with each corresponding entity; and determining, at least in part, the set of relevant entities by a computer process to cross-reference the entity data and user data from each data source.

28. The server computer of claim 16, wherein the user data comprises social networking cues, wherein the method further comprises:

for each social networking cue from the user data, determining, by the server computer, a weight for the social networking cue associated with how friendly the primary user is with the user that made the social networking cue based on the social networking cues and a social network site from where the social networking cue originated; and adjusting the initial categorization and initial order of relevance based on the weight.

29. The server computer of claim 16, wherein the user data comprises social networking cues, wherein the method further comprises:

for each social networking cue from the user data that includes a short form message, performing name-entity recognition on the social networking cue to determine a mapping between the social networking cue and an entity in the entity database; and determining, by the server computer, to what degree the social networking cue is positive or negative.

30. The server computer of claim 16, wherein obtaining, via the user device, user feedback related to the initial categorization includes:

obtaining a first response and a second response;

wherein the first response includes a first selection of a first category; wherein the second response includes a second selection of a second category that is different than the first category, and a third selection of a particular entity that is classified in the second category; and adjusting the initial categorization based on the user feedback to form the adjusted categorization and an adjusted order of relevance includes:

adjusting the particular entity to be in the first category; and adjusting the initial order of relevance based on the particular entity being in the first category.

* * * * *

UNITED STATES PATENT AND TRADEMARK OFFICE
CERTIFICATE OF CORRECTION

PATENT NO.         : 9,189,551 B2
APPLICATION NO.    : 13/553646
DATED              : November 17, 2015
INVENTOR(S)        : Scott Paul Goodson et al.

Page 1 of 1

It is certified that error appears in the above-identified patent and that said Letters Patent is hereby corrected as shown below:

In the claims:

Column 14, line 12, delete "data base"

Column 16, line 41, insert --database-- after "wherein the user"

Signed and Sealed this
Fifth Day of April, 2016

Michelle K. Lee
*Director of the United States Patent and Trademark Office*